US011048433B2

(12) United States Patent
Yeh

(10) Patent No.: US 11,048,433 B2
(45) Date of Patent: Jun. 29, 2021

(54) MEMORY CONTROL METHOD WITH LIMITED DATA COLLECTION OPERATIONS, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

(*) Notice: Subject to any disclaimer, the term of this patent is extended or adjusted under 35 U.S.C. 154(b) by 12 days.

(21) Appl. No.: 16/542,308

(22) Filed: Aug. 16, 2019

(65) Prior Publication Data

US 2020/0393989 A1 Dec. 17, 2020

(30) Foreign Application Priority Data

Jun. 12, 2019 (TW) ................................. 108120381

(51) Int. Cl.
*G06F 12/00* (2006.01)
*G06F 3/06* (2006.01)
*G06F 12/02* (2006.01)
*G06F 13/00* (2006.01)
*G06F 13/28* (2006.01)

(52) U.S. Cl.
CPC .......... *G06F 3/0656* (2013.01); *G06F 3/0659* (2013.01); *G06F 3/0679* (2013.01); *G06F 12/0246* (2013.01); *G06F 3/0607* (2013.01)

(58) Field of Classification Search
CPC .... G06F 3/0656; G06F 3/0659; G06F 3/0679; G06F 12/0246; G06F 3/0607
See application file for complete search history.

(56) References Cited

U.S. PATENT DOCUMENTS

| 2010/0262979 A1* | 10/2010 | Borchers ................. G06F 9/544 719/321 |
| 2016/0170656 A1* | 6/2016 | Tressler ................ G06F 11/106 711/103 |
| 2017/0255405 A1* | 9/2017 | Zettsu ................. G06F 12/0246 |
| 2018/0239537 A1* | 8/2018 | d'Abreu ................ G06F 3/0644 |
| 2018/0341413 A1* | 11/2018 | Lai ........................ G06F 3/0647 |

FOREIGN PATENT DOCUMENTS

TW I615710 2/2018

* cited by examiner

*Primary Examiner* — Mark A Giardino, Jr.
(74) *Attorney, Agent, or Firm* — JCIPRNET

(57) ABSTRACT

A memory control method, a memory storage device, and a memory control circuit unit are disclosed. The memory control method includes: performing a first write operation to write first data to a first physical unit in a first physical group through a first channel; performing a limited data collection operation to collect second data, wherein the limited data collection operation limits that the second data does not include data to be collected from the first physical group after the first write operation is completed; and performing a second write operation during a period of performing the first write operation, so as to write the second data to a second physical unit in the second physical group through a second channel. In addition, the limited data collection operation and the second write operation are configured to release at least one spare physical unit.

27 Claims, 13 Drawing Sheets

MEMORY CONTROL METHOD WITH LIMITED DATA COLLECTION OPERATIONS, MEMORY STORAGE DEVICE AND MEMORY CONTROL CIRCUIT UNIT

CROSS-REFERENCE TO RELATED APPLICATION

This application claims the priority benefit of Taiwan application serial no. 108120381, filed on Jun. 12, 2019. The entirety of the above-mentioned patent application is hereby incorporated by reference herein and made a part of this specification.

BACKGROUND OF THE DISCLOSURE

1. Field of the Disclosure

The disclosure relates to a memory control technique, and particularly relates to a memory control method, a memory storage device, and a memory control circuit unit.

2. Description of Related Art

The markets of digital cameras, cellular phones, and MP3 players have expanded rapidly in recent years, resulting in escalated demand for storage media by consumers. Owing to the characteristics of data non-volatility, low power consumption, compact size, and having no mechanical structure exhibited by the rewritable non-volatile memory module (e.g., flash memory), the rewritable non-volatile memory module is ideal for being built in the portable multi-media devices mentioned above.

When a memory storage device is shipped out of the factory, some of the physical units in the memory storage device are configured as spare physical units, so as to use the spare physical units to store new data. After the memory storage device is put into use for a period of time, the number of the spare physical units in the memory storage device may gradually decrease. The memory storage device may perform a data merge process (also referred to as a garbage collection process) to copy valid data from source units to recycle units (also referred to as target units) and erase the physical units as the source units to release new spare physical units. However, in a multi-channel memory storage device, if a channel used for reading valid data is in a busy state (e.g., in a process of writing the collected valid data to the target unit), a collection of required valid data by this channel can only be executed after the channel completes the data write operation. During the period of waiting for the collection of valid data, other channels are unable to perform the data write operation due to not receiving enough valid data. Therefore, the system performance is deteriorated.

SUMMARY OF THE DISCLOSURE

The disclosure provides a memory control method, a memory storage device, and a memory control circuit unit capable of alleviating the issue and/or improving system performance.

An exemplary embodiment of the disclosure provides a memory control method for a rewritable non-volatile memory module. The rewritable non-volatile memory module includes at least one first physical group and at least one second physical group. The memory control method includes: performing a first write operation to write first data to at least one first physical unit in the at least one first physical group through at least one first channel; performing a limited data collection operation to collect second data, wherein the limited data collection operation limits that the second data does not include data to be collected from the at least one first physical group after the first write operation is completed; and performing a second write operation during a period of performing the first write operation, so as to write the second data to at least one second physical unit in the at least one second physical group through at least one second channel, The limited data collection operation and the second write operation are both serve to release at least one spare physical unit.

An exemplary embodiment of the disclosure provides a memory storage device. The memory storage device includes a connection interface unit, a rewritable non-volatile memory module, and a memory control circuit unit. The connection interface unit is configured to be coupled to a host system. The rewritable non-volatile memory module includes at least one first physical group and at least one second physical group. The memory control circuit unit is coupled to the connection interface unit and the rewritable non-volatile memory module. The memory control circuit unit is configured to perform a first write operation to write first data to at least one first physical unit in the at least one first physical group through at least one first channel. The memory control circuit unit is further configured to perform a limited data collection operation to collect second data, wherein the limited data collection operation limits that the second data does not include data to be collected from the at least one first physical group after the first write operation is completed. The memory control circuit unit is further configured to perform a second write operation during a period of performing the first write operation, so as to write the second data to at least one second physical unit in the at least one second physical group through at least one second channel. The limited data collection operation and the second write operation are both serve to release at least one spare physical unit.

An exemplary embodiment of the disclosure provides a memory control circuit unit for controlling a rewritable non-volatile memory module. The rewritable non-volatile memory module includes at least one first physical group and at least one second physical group. The memory control circuit unit includes a host interface, a memory interface, a buffer memory, and a memory management circuit. The host interface is configured to be coupled to a host system. The memory interface is configured to be coupled to the rewritable non-volatile memory module. The memory management circuit is coupled to the host interface, the memory interface, and the buffer memory. The memory management circuit is configured to perform a first write operation to write first data to at least one first physical unit in the at least one first physical group through at least one first channel. The memory management circuit is further configured to perform a limited data collection operation to collect second data, wherein the limited data collection operation limits that the second data does not include data to be collected from the at least one first physical group after the first write operation is completed. The memory management circuit is further configured to perform a second write operation during a period of performing the first write operation, so as to write the second data to at least one second physical unit in the at least one second physical group through at least one second channel. The limited data collection operation and the second write operation are both serve to release at least one spare physical unit.

Based on the above, the rewritable non-volatile memory module includes at least one first physical group and at least one second physical group. During the period of performing the first write operation to write the first data to the physical unit in the first physical group through the first channel, the second write operation may be performed to write the second data to the physical unit in the second physical group through the second channel. Besides, the limited data collection operation may also be performed to collect the second data. Specifically, the limited data collection operation limits that the second data does not include data to be collected from the first physical group after the first write operation is completed. Accordingly, the issue that the system performance is deteriorated because a specific channel is in the busy state and the valid data is unable to be collected in a real-time manner through the channel can be alleviated.

To make the aforementioned and other features of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and may be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
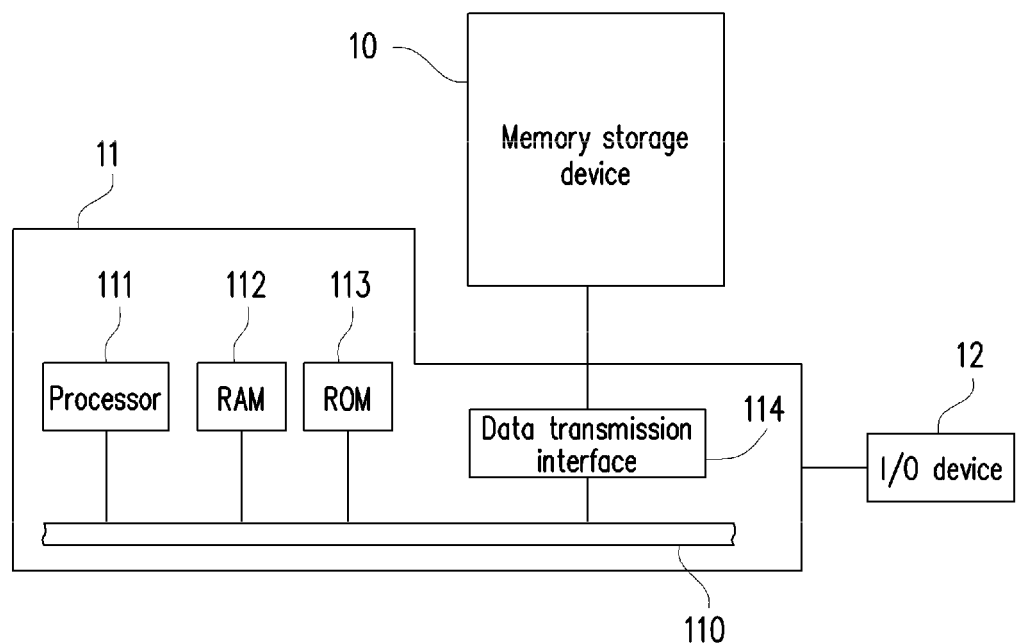
FIG. 1 is a schematic diagram of a host system, a memory storage device, and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Reference may now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally, a memory storage device (also referred to as a memory storage system) includes a rewritable non-volatile memory module and a controller (also referred to as a control circuit). The memory storage device is normally used together with a host system, allowing the host system to write data to the memory storage device or read data from the memory storage device.

Figure 2:
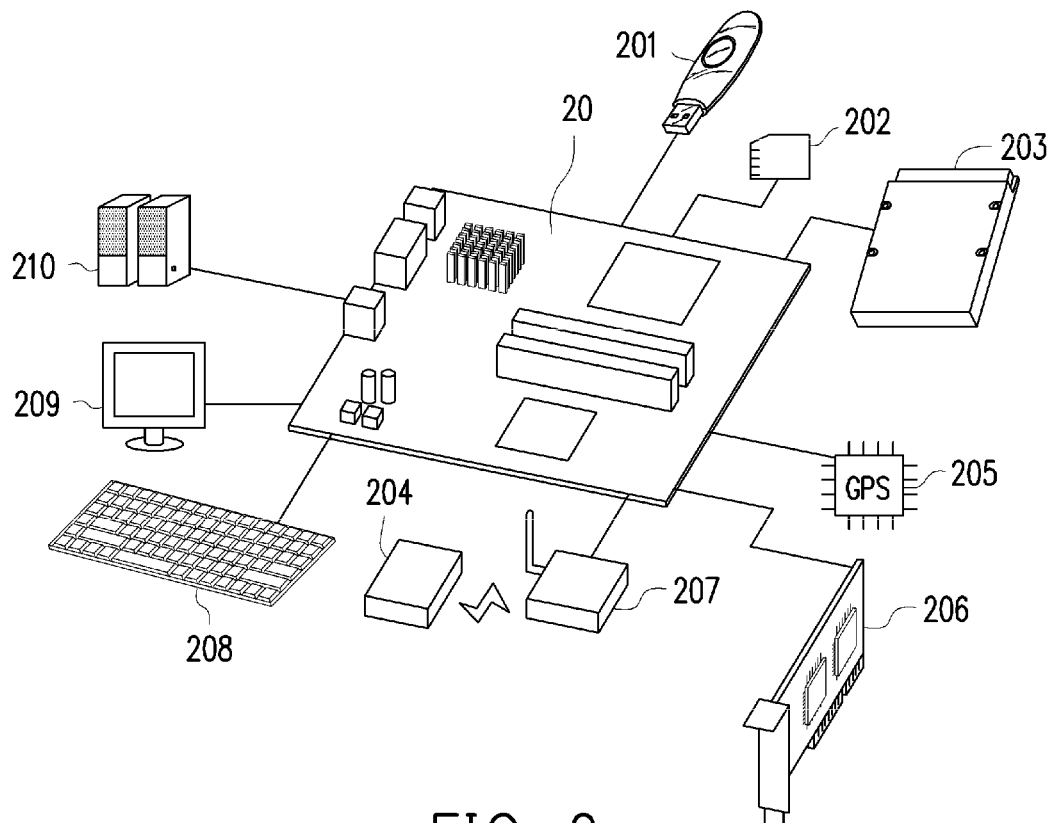
FIG. 2 is a schematic diagram of a host system, a memory storage device, and an input/output (I/O) device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Referring to FIG. 1 and FIG. 2, a host system 11 normally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to a memory storage device 10 through the data transmission interface 114. For example, the host system 11 may store data to the memory storage device 10 or read data from the memory storage device 10 via the data transmission interface 114. In addition, the host system 11 is coupled to an I/O device 12 through the system bus 110. For example, the host system 11 may transmit an output signal to the I/O device 12 or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. The number of data transmission interfaces 114 may be one or more. The motherboard 20 may be coupled to the memory storage device 10 via a wired or a wireless method through the data transmission interface 114. The memory storage device 10 may be, for example, a flash drive 201, a memory card 202, a Solid State Drive (SSD) 203, or a wireless memory storage device 204. The wireless memory storage device 204 may be, for example, a Near Field Communication (NFC) memory storage device, a wireless fidelity (WiFi) memory storage device, a Bluetooth memory storage device, a Bluetooth low energy (BLE) memory storage device (e.g., iBeacon), or other memory storage devices based on various types of wireless communication technologies. In addition, the motherboard 20 may also be coupled to a Global Positioning System (GPS) module 205, a network interface card 206, a wireless transmission device 207, a keyboard 208, a screen 209, a speaker 210, or other types of I/O devices through the system bus 110. For example, in an exemplary embodiment, the motherboard 20 may access the wireless memory storage device 204 through the wireless transmission device 207.

Figure 3:
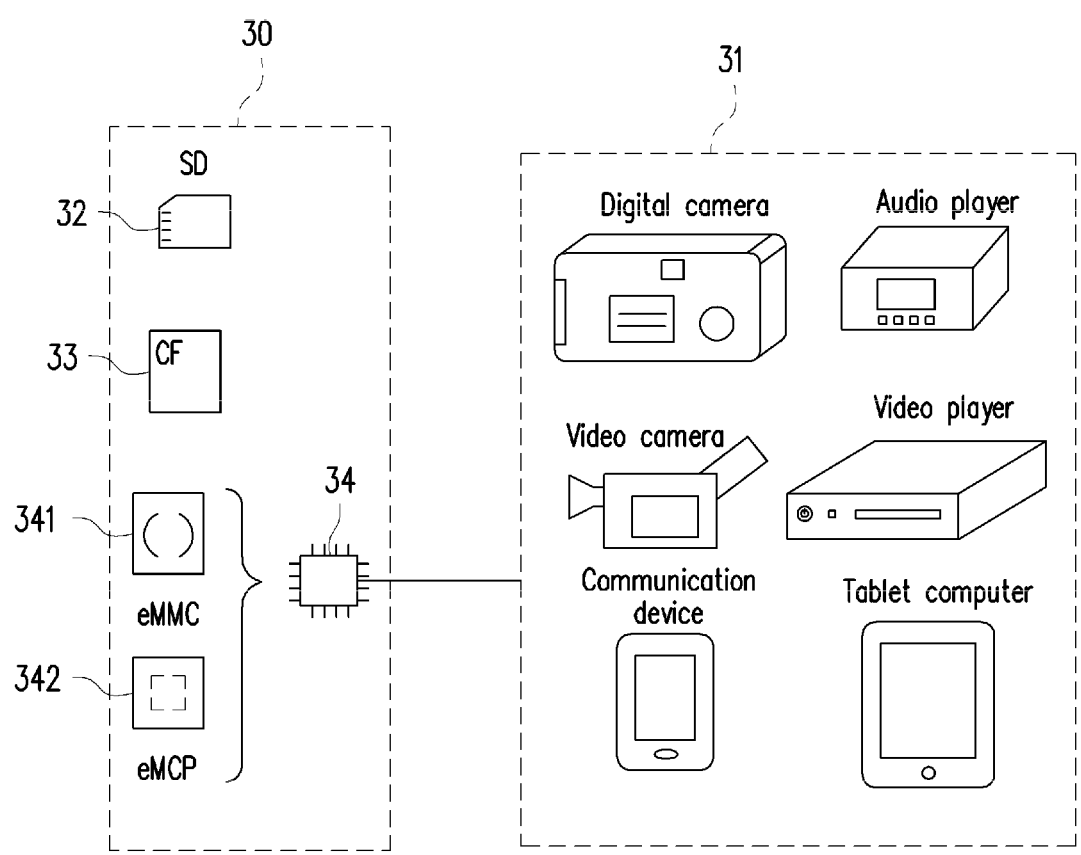
FIG. 3 is a schematic diagram of a host system and a memory storage device according to another exemplary embodiment of the disclosure.

In an exemplary embodiment, the host system mentioned may be any system that may substantially work with a memory storage device to store data. Although in the exemplary embodiments above, a computer system is used as the host system for illustration, FIG. 3 is a schematic diagram of a host system and a memory storage device according to another exemplary embodiment of the disclosure. Referring to FIG. 3, in another exemplary embodiment, a host system 31 may also be a digital camera, a video camera, a communication device, an audio player, a video player, a tablet computer, or other systems. A memory storage device 30 may be a secure digital (SD) card 32, a compact flash (CF) card 33, an embedded storage device 34, or other types of non-volatile memory storage devices used by the host system 31. The embedded storage device 34 includes an embedded multimedia card (eMMC) 341, and/or an embedded Multi Chip Package (eMCP) storage device 342, or various types of embedded storage devices which directly couple a memory module onto a substrate of a host system.

Figure 4:
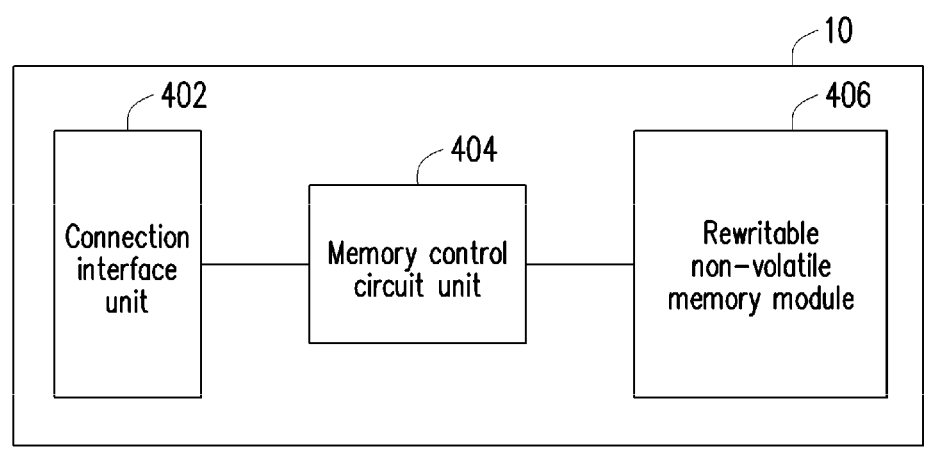
FIG. 4 is a functional block diagram of a memory storage device according to an exemplary embodiment of the disclosure.

FIG. 4 is a functional block diagram of a memory storage device according to an exemplary embodiment of the disclosure. Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. In the exemplary embodiment, the connection interface unit 402 is compatible with the Serial Advanced Technology Attachment (SATA) standard. The memory storage device 10 may communicate with the host system 11 via the connection interface unit 402. However, it must be understood that the disclosure is not limited thereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed II (UHS-II) interface standard, the Memory Stick (MS) interface standard, the Multi-chip Package (MCP) interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged in one chip with the memory control circuit unit 404 or the connection interface unit 402 may be disposed outside a chip containing the memory control circuit unit 404.

The memory control circuit unit 404 is configured to perform multiple logic gates or control commands implemented using a hardware type or a firmware type and execute operations such as writing, reading, and erasing of data in the rewritable non-volatile memory module 406 according to the command of the host system 11.

The rewritable non-volatile memory module 406 is coupled to the memory control circuit unit 404 and is configured to store data written by the host system 11. The rewritable non-volatile memory module 406 may be a Single Level Cell (SLC) NAND flash memory module (i.e., a flash memory module which stores 1-bit in one memory cell), a Multi-level Cell (MLC) NAND flash memory module (i.e., a flash memory module which stores 2-bits in one memory cell), a Triple Level Cell (TLC) NAND flash memory module (i.e., a flash memory module which stores 3-bits in one memory cell), a Quad Level Cell (QLC) NAND flash memory module (i.e., a flash memory module which stores 4-bits in one memory cell), other flash memory modules, or other memory modules with the same characteristic.

Each memory cell of the rewritable non-volatile memory module 406 stores one or more bits by changing a voltage (also referred to as threshold voltage in the following). Specifically, a charge trapping layer is provided between the control gate and the channel of each memory cell. By applying a write voltage to the control gate, the quantity of electrons of the charge trapping layer is changed, and consequently the threshold voltage of the memory cell is changed. The process of changing the threshold voltage of the memory cell is also referred to "writing data to the memory cell" or "programming the memory cell". As the threshold voltage changes, each memory cell of the rewritable non-volatile memory module 406 has a plurality of storage states. By applying a read voltage, the storage state to which a memory cell belongs can be determined, and the one or more bits stored in the memory cell can thereby be obtained.

In the exemplary embodiment, the memory cells of the rewritable non-volatile memory module 406 may form a plurality of physical programming units, and the physical programming units may form a plurality of physical erasing units. Specifically, memory cells on the same word line may form one or more physical programming units. If each memory cell is capable of storing two or more bits, the physical programming units on the same word line may be at least classified into a lower physical programming unit and an upper physical programming unit. For example, the least significant bit (LSB) of a memory cell belongs to the lower physical programming unit, and the most significant bit (MSB) of a memory cell belongs to the upper physical programming unit. In general, in the MLC NAND flash memory, the writing speed of the lower physical programming unit is higher than the writing speed of the upper physical programming unit, and/or the reliability of the lower physical programming unit is higher than the reliability of the upper physical programming unit.

In the exemplary embodiment, the physical programming unit is the minimum programming unit. In other words, the physical programming unit is the minimum unit for data writing. For example, the physical programming unit is a physical page or a physical sector. If the physical programming unit is a physical page, the physical programming units may include a data bit region and a redundancy bit region. The data bit region includes a plurality of physical sectors and is configured to store user data, whereas the redundancy bit region serves to store system data (e.g., management data such as error checking/correcting code). In the exemplary embodiment, the data bit region includes 32 physical sectors, and the size of each physical sector is 512 bytes (Bs). However, in other exemplary embodiments, the data bit region may also include 8, 16, or more or fewer physical sectors, and the size of each physical sector may be greater or smaller. Meanwhile, the physical erasing unit is the minimum erasing unit. In other words, each physical erasing unit includes the minimum number of memory cells for being erased together. For example, the physical erasing unit may be a physical block.

Figure 5:
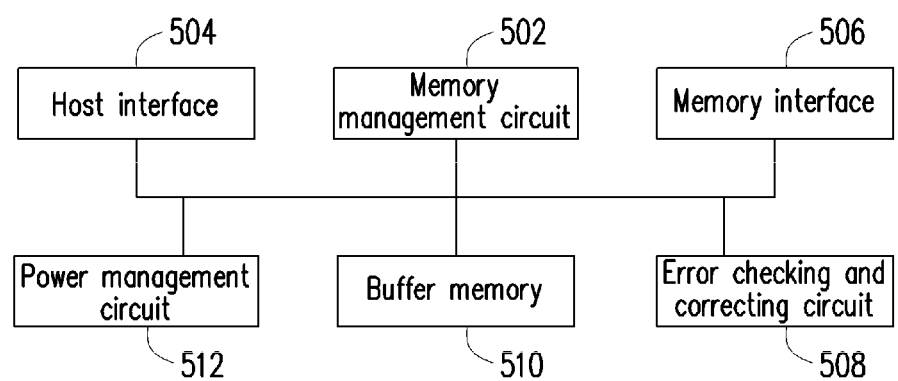
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504, and a memory interface 506.

The memory management circuit 502 is configured to control the overall configuration of the memory control circuit unit 404. Specifically, the memory management circuit 502 has a plurality of control commands. When the memory storage device 10 is operated, the control commands are executed to perform various operations such as data writing, data reading and data erasing. In the following, the descriptions about the operation of the memory management circuit 502 are equivalent to the descriptions about the operation of the memory control circuit unit 404.

In the exemplary embodiment, the control commands of the memory management circuit 502 are implemented as firmware. For instance, the memory management circuit 502 has a microprocessor unit (not shown) and a read-only memory (not shown), and the control commands are burnt into the read-only memory. When the memory storage device 10 is operated, the control commands are executed by the microprocessor unit for various operations, such as data writing, data reading or data erasing.

In another exemplary embodiment, the control commands of the memory management circuit 502 may also be stored as program codes in a specific region (e.g., the system region designated to store system data in the memory module) of the rewritable non-volatile memory module 406. Moreover, the memory management circuit 502 has a microprocessor unit (not shown), a read-only memory (not shown), and a random access memory (not shown). Specifically, the read-only memory has a boot code. When the memory control circuit unit 404 is enabled, the boot code is firstly executed by the microprocessor unit to load the control commands stored in the rewritable non-volatile memory module 406 to the random access memory of the memory management circuit 502. Afterwards, the microprocessor unit executes the control commands for various data operation such as data writing, data reading and data erasing.

Besides, in another exemplary embodiment, the control commands of the memory management circuit 502 may also be implemented as hardware. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data to the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write command sequence, the read command sequence and the erase command sequence may respectively include one or more program codes or command codes and serve to instruct the rewritable non-volatile memory module 406 to execute the corresponding writing, reading, and erasing operations, etc. In an exemplary embodiment, the memory management circuit 502 may further issue other types of command sequences to the rewritable non-volatile memory module 406 to instruct the rewritable non-volatile memory module 406 to execute the corresponding operations.

The host interface 504 is coupled to the memory management circuit 502. The memory management circuit 502 may communicate with the host system 11 through the host interface 504. The host interface 504 may be configured to receive and identify commands and data transmitted from the host system 11. For example, the commands and data transmitted from the host system 11 may be transmitted to the memory management circuit 502 through the host interface 504. In addition, the memory management circuit 502 may transmit data to the host system 11 through the host interface 504. In the exemplary embodiment, the host interface 504 is compatible with the SATA standard. However, the disclosure is not limited thereto. The host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 by the memory interface 506. Specifically, if the memory management circuit 502 intends to access the rewritable non-volatile memory module 406, the memory interface 506 may transmit the corresponding command sequence. For example, the command sequences may include the write command sequence instructing to write data, the read command sequence instructing to read data, the erase command sequence instructing to erase data, and the corresponding command sequences instructing to perform various memory operations (e.g., changing the read voltage level or executing a recycling operation, etc.). The command sequences are, for example, generated by the memory management circuit 502 and transmitted to the rewritable non-volatile memory module 406 through the memory interface 506. These command sequences may include one or more signals, or data on a bus. The signals or data may include command codes or program codes. For example, the read command sequence may include information of reading identification codes, memory addresses, etc.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to execute an error checking and correcting operation to ensure the accuracy of data. Specifically, when the memory management circuit 502 receives a write command from the host system 11, the error checking and correcting circuit 508 may generate a corresponding error correcting code (ECC) and/or error detecting code (EDC) for the data corresponding to the write command, and the memory management circuit 502 may write the data corresponding to the write command and the corresponding ECC and/or EDC to the rewritable non-volatile memory module 406. Afterwards, when reading data from the rewritable non-volatile memory module 406, the memory management circuit 502 may also read the ECC and/or EDC corresponding to the data, and the error checking and correcting circuit 508 may execute the error checking and correcting operation on the read data according to the ECC and/or EDC.

The buffer memory 510 is coupled to the memory management circuit 502 and configured to temporarily store data and commands from the host system 11 or data from the rewritable non-volatile memory module 406. The power management circuit 512 is coupled to the memory management circuit 502 and configured to control the power of the memory storage device 10.

In an exemplary embodiment, the rewritable non-volatile memory module 406 of FIG. 4 may also be referred to as a flash memory module, the memory control circuit unit 404 of FIG. 4 may also be referred to as a flash memory controller configured to control a flash memory module, and/or the memory management circuit 502 of FIG. 5 may also be referred to as a flash memory management circuit.

Figure 6:
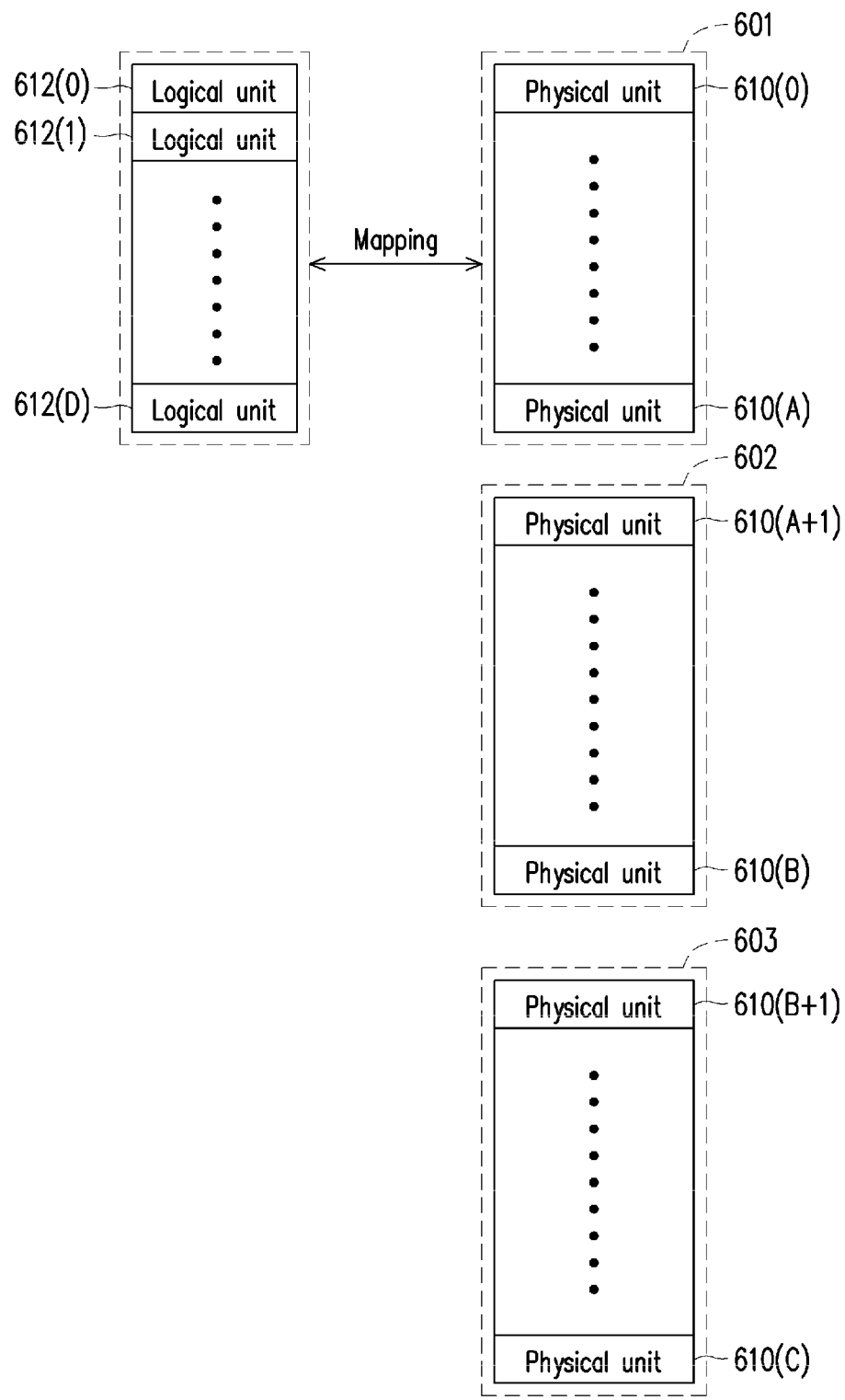
FIG. 6 is a schematic diagram illustrating managing a rewritable non-volatile memory module according to an exemplary embodiment of the disclosure.

FIG. 6 is a schematic diagram illustrating managing a rewritable non-volatile memory module according to an exemplary embodiment of the disclosure.

Referring to FIG. 6, the memory management circuit 502 may logically group physical units 610(0) to 610(C) of the rewritable non-volatile memory module 406 to a storage region 601, a spare region 602, and a system region 603. The physical units 610(0) to 610(A) in the storage region 601 store data. For example, the physical units 610(0) to 610(A) in the storage region 601 may store valid data and invalid data. The physical units 610(A+1) to 610(B) in the spare region 602 have not been used to store data (e.g., valid data) yet. The physical units 610(B+1) to 610(C) in the system region 603 are configured to store system data, such as logical-to-physical mapping tables, bad block management tables, a device model number, or other types of management data.

In the exemplary embodiment, one physical unit includes one or more physical erasing units. However, in another exemplary embodiment, one physical unit may also include one or more physical programming units or be composed of one or more continuous or discontinuous physical addresses. To store data, the memory management circuit 502 may select at least one physical unit from the physical units 610(A+1) to 610(B) in the spare region 602 and store data from the host system 11 or from at least one physical unit in the storage region 601 to the selected physical unit. Meanwhile, the selected physical unit may be associated with the storage region 601. Besides, after erasing a physical unit in the storage region 601, the erased physical unit may be associated with the spare region 602 again and thus become a new spare physical unit.

The memory management circuit 502 may assign logical units 612(0) to 612(D) to map the physical erasing units 610(0) to 610(A) in the storage region 601. One logical unit may include one or more logical programming units, one or more logical erasing units, or be composed of one or more continuous or discontinuous logical addresses. Each logical unit in the logical units 612(0) to 612(D) may be mapped to one or more physical units. It should be noted that the memory management circuit 502 may also not assign any logical unit being mapped to the system region 603, so as to prevent the system data stored in the system region 603 from being modified by the user.

The memory management circuit 502 may record the mapping relationship between the logical units and the physical units (also referred to a logical-to-physical mapping information or mapping information) in at least one logical-to-physical mapping table. The logical-to-physical mapping table is stored in the physical units 610(B+1) to 610(C) of the system region 603.

When the host system 11 intends to read data from or write data to the memory storage device 10, the memory management circuit 502 may perform a data access operation with respect to the memory storage device 10 according to the logical-to-physical mapping table.

It should be noted that valid data is the latest data belonging to a logical unit, and invalid data is not the latest data belonging to any logical unit. For example, if the host system 11 stores new data to a logical unit and overwrites old data originally stored in the logical unit (i.e., updating data belonging to the logical unit), the new data stored in the storage region 601 is the latest data belonging to the logical unit and is labeled as valid, while the overwritten old data may possibly still be stored in the storage region 601 but labeled as invalid.

In the exemplary embodiment, if data belonging to a logical unit is updated, the mapping relationship between the logical unit and the physical unit storing the old data belonging to the logical unit is removed, and the mapping relationship between the logical unit and the physical unit storing the latest data belonging to the logical unit is established. However, in another exemplary embodiment, if the data belonging to a logical unit is updated, the mapping relationship between the logical unit and the physical unit storing the old data belonging to the logical address may still be maintained.

It is noted that in the following description, some terms may be replaced with corresponding abbreviations for ease of reading (see Table 1).

TABLE 1

| rewritable non-volatile memory module | RNVM module |
|---|---|
| memory management circuit | MMC |
| physical unit | PU |

When the memory storage device 10 is shipped out of the factory, the total number of the PUs 610(A+1) to 610(B) belonging to the spare region 602 may be a preset number (e.g., 30). In the operation of the memory storage device 10, more and more PUs are chosen from the spare region 602 and associated with the storage region 601 to store data (e.g., store user data from the host system 11). Therefore, the total number of the PUs belonging to the spare region 602 may gradually decrease as the memory storage device 10 is being used.

In the operation of the memory storage device 10, the MMC 502 may continuously update the total number of the PUs belonging the spare region 602. The MMC 502 may start a data merge operation according to the total number of the PUs in the spare region 602 (i.e., the total number of spare PUs). For example, the MMC 502 may determine whether the total number of the PUs belonging to the spare region 602 is less than or equal to a threshold value (also referred to as a first threshold value). The first threshold value may be, for example, 2 or a greater value (e.g., 10). The disclosure does not intend to impose a limitation on this regard. If the total number of the PUs belonging to the spare region 602 is less than or equal to the first threshold value, the MMC 502 may start the data merge operation. In an exemplary embodiment, the data merge operation may also be referred to as a garbage collection operation.

In the data merge operation, the MMC 502 may select at least one PU from the storage region 601 to serve as the source unit and select at least one PU from the spare region to serve as the recycle unit (also referred to as the target unit). For example, the MMC 502 may select the source unit according to a data amount or a data distribution of the valid data stored in at least one PU in the storage region 601. The MMC 502 may transmit at least one command sequence to instruct the RNVM module 406 to copy valid data from one or more PUs serving as the source unit to one or more PUs serving as the recycle unit. The PU which serves as the recycle unit and has been fully written with valid data may be associated with the storage region 601. If all the valid data stored in a PU has been copied to the recycle unit, the PU may be erased and associated with the spare region 602. In an exemplary embodiment, the operation of associating a PU back to the spare region 602 from the storage region 601 (or the operation of erasing a PU) is also referred to as releasing a spare PU. By performing the data merge operation, one or more spare PUs may be released, so that the total number of the PUs belonging to the spare region 602 may gradually increase.

After the data merge operation is started, if the PUs belonging to the spare region 602 meet a specific condition, the data merge operation may be stopped. For example, the MMC 502 may determine whether the total number of the PUs belonging to the spare region 602 is greater than or equal to a threshold value (also referred to as a second threshold value). For example, the second threshold value may be greater than or equal to the first threshold value. If the total number of the PUs belonging to the spare region 602 is greater than or equal to the second threshold value, the MMC 502 may stop the data merge operation. It should be noted that stopping the data merge operation refers to ending the data merge operation currently being performed. After the data merge operation is stopped, if the total number of the PUs belonging to the spare region 602 is again less than or equal to the first threshold value, a next data merge operation may be performed again to try to release a new spare PU.

Figure 7:
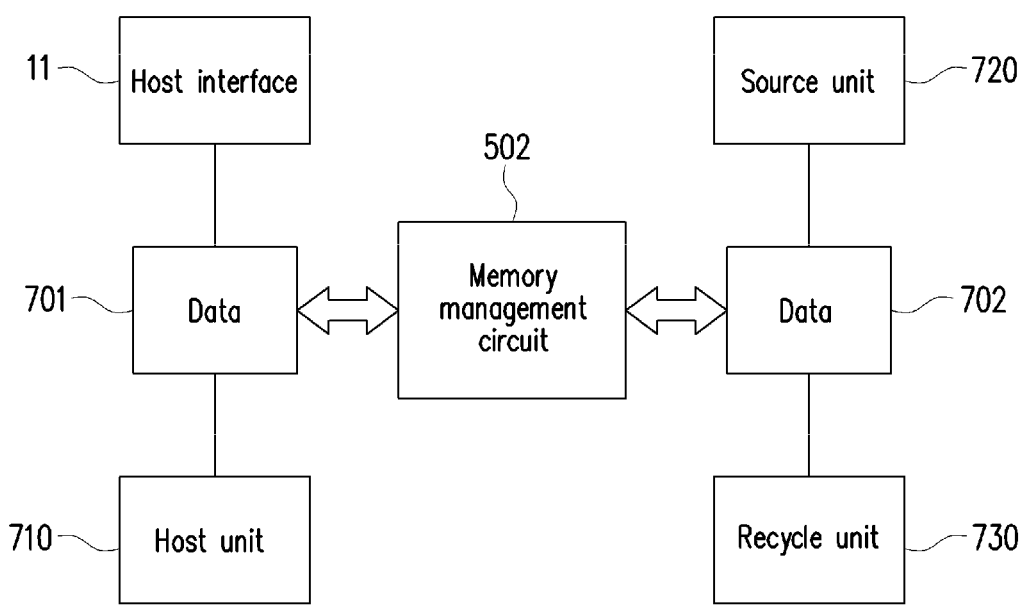
FIG. 7 is a schematic diagram illustrating a host write operation and a data merge operation according to an exemplary embodiment of the disclosure.

FIG. 7 is a schematic diagram illustrating a host write operation and a data merge operation according to an exemplary embodiment of the disclosure. Referring to FIG. 7, in a host write operation, the host system 11 may transmit at least one write command to instruct a writing of data 701 to one or more logical units. According to the write command, the MMC 502 may instruct a storing of the data 701 to a host unit 710 mapped to the logical unit. For example, the host unit 710 may include one or more PUs selected from the spare region 602 of FIG. 6.

In addition, the MMC 502 may start a data merge operation to release a new spare PU.

For example, in the data merge operation, data 702 may be collected from at least one PU serving as the source unit 720 and written to at least one PU serving as the recycle unit 730. The data 702 includes valid data stored in the source unit 720. If the valid data stored in a PU serving as the source unit 720 is completely copied to the recycle unit 730, the PU may be erased and become a new spare PU. In this way, the total number of the spare PUs in the spare region 602 of FIG. 6 may be gradually increased.

Figure 8:
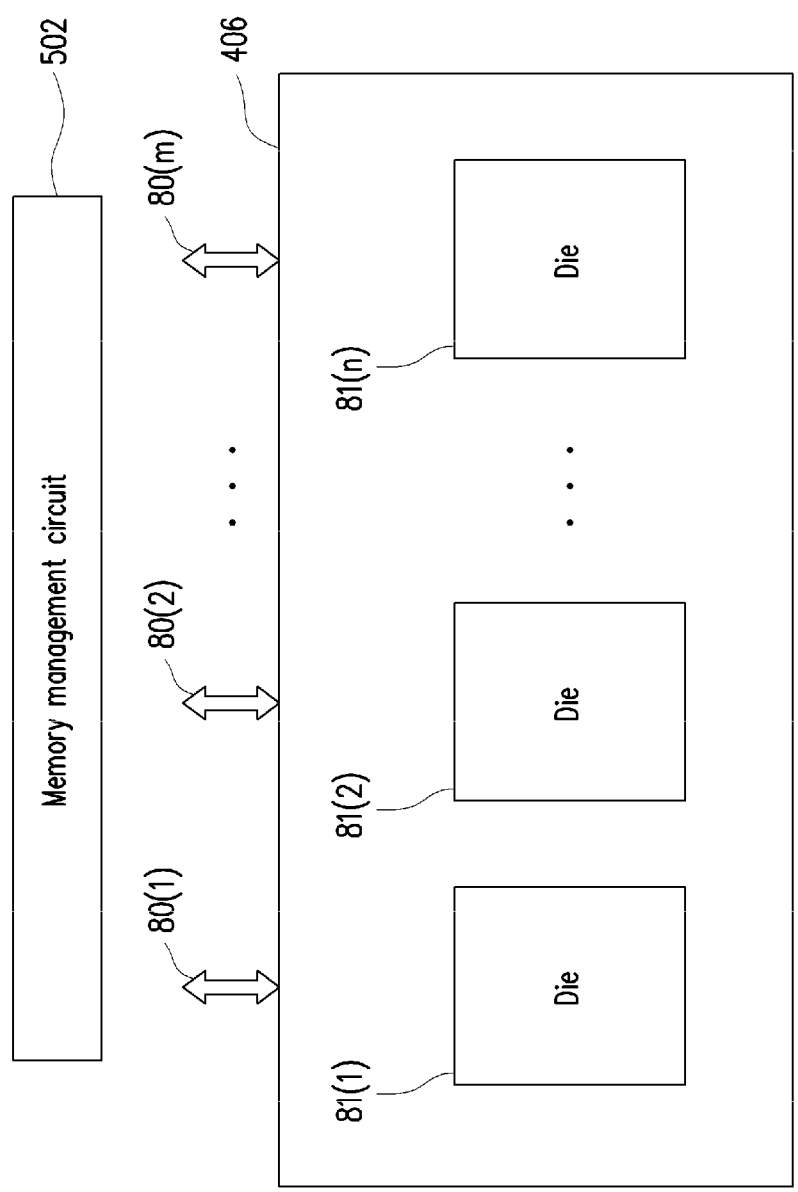
FIG. 8 is a schematic diagram illustrating a memory management circuit and a rewritable non-volatile memory module according to an exemplary embodiment of the disclosure.

FIG. 8 is a schematic diagram illustrating a MMC and a RNVM module according to an exemplary embodiment of the disclosure. Referring to FIG. 8, the RNVM module 406 includes physical groups 81(1) to 81(n). In the exemplary embodiment, each of the physical groups 81(1) to 81(n) represents a die. For example, the RNVM module 406 may include a plurality of dies, and each of the physical groups 81(1) to 81(n) may correspond to a die. However, in another exemplary embodiment, each of the physical groups 81(1) to 81(n) may also refer to a chip enable (CE) or a plane (also referred to as a memory plane). In addition, n may be 2, 4, 8, or other values. The disclosure does not intend to limit the total number of the physical groups 81(1) to 81(n).

Each of the physical groups 81(1) to 81(n) includes a plurality of PUs. Channels 80(1) to 80(m) may also be referred to as memory channels. The MMC 502 may access the PUs in the physical groups 81(1) to 81(n) individually or in parallel through the channels 80(1) to 80(m). For example, by accessing PUs of at least two of the physical groups 81(1) to 81(8) in parallel through at least two channels among the channels 80(1) to 80(m), the accessing performance of the RNVM module 406 may be improved.

After starting the data merge operation, the MMC 502 may select at least one PU to serve as the source unit and select at least one PU to serve as the recycle unit from the physical groups 81(1) to 81(n). In response to the start of the data merge operation, the MMC 502 may perform at least one data collection operation to collect valid data from the source unit and perform at least one data write operation to write the collected valid data to the recycle unit. The data collection operation and the data write operation performed in response to the start of the data merge operation are configured to release the spare PUs.

In an exemplary embodiment, the physical groups 81(1) to 81(n) may be at least grouped into at least one first physical group and at least one second physical group. For example, the physical groups 81(1) to 81(e) may belong to the first physical group, and the physical groups 81(e+1) to 81(n) may belong to the second physical group. The disclosure does not intend to limit the numbers of physical groups in the first physical group and the second physical group.

After the data merge operation is started, the MMC 502 may perform a data write operation (also referred to as a first write operation) to write the valid data (also referred to as first data) collected in the data merge operation to one or more PUs (also referred to as first PUs) in the first physical group through at least one channel (also referred to as a first channel) among the channels 80(1) to 80(m). During the period of performing the first write operation, the MMC 502 may perform another data write operation (also referred to as a second write operation) to write other valid data (also referred to as second data) collected in the data merge operation to one or more PUs (also referred to as second PUs) in the second physical group through at least another channel (also referred to as a second channel) among the channels 80(1) to 80(m). It should be noted that the second data may include data collected from the second physical group during the period of performing the first write operation. However, the second data does not include data to be collected from the first physical group after the first write operation is completed. In this way, the execution time of the first write operation and the execution time of the second write operation may be at least partially overlapped (or at least be performed in partial parallel), thereby improving the efficiency of the data merge operation.

In an exemplary embodiment, after the data merge operation is started, the MMC 502 may perform a limited data collection operation to collect the second data. For example, the limited data collection operation may limit that the second data to be collected does not include data to be collected from the first physical group after the first write operation is completed.

Compared with the normal data collection operation, the limited data collection operation may reduce the waiting time for data collection and improve the efficiency of the data merge operation.

Figure 9:
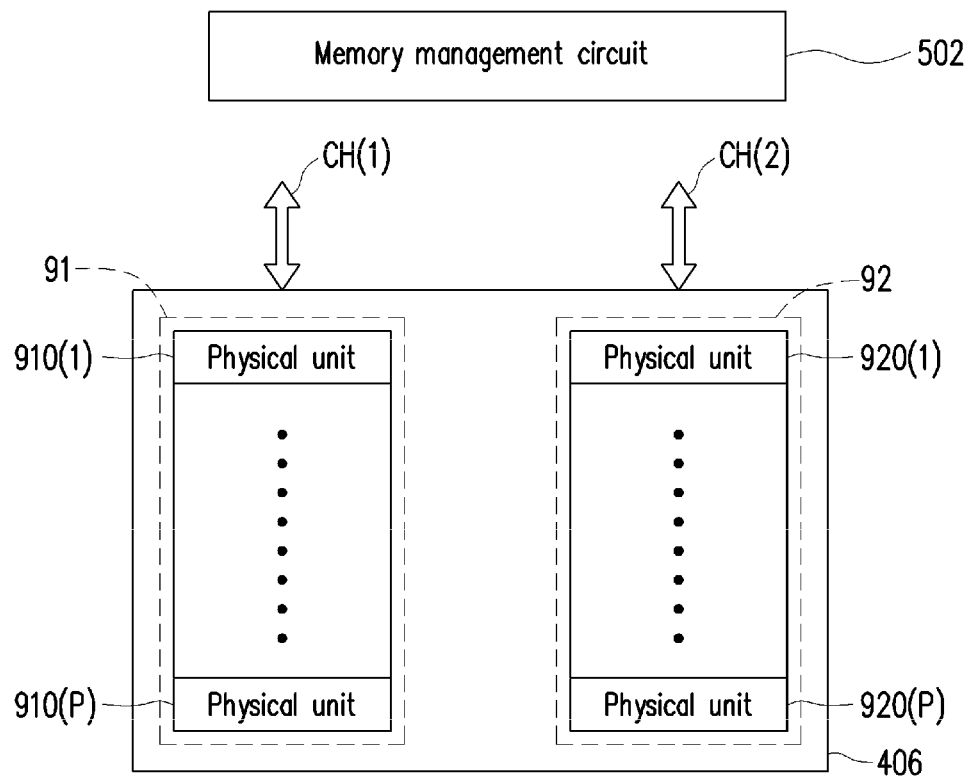
FIG. 9 is a schematic diagram illustrating a memory management circuit and a rewritable non-volatile memory module according to an exemplary embodiment of the disclosure.

FIG. 9 is a schematic diagram illustrating a MMC and a RNVM module according to an exemplary embodiment of the disclosure. Referring to FIG. 9, it is assumed that the RNVM module 406 includes physical groups 91 and 92. The physical group 91 belongs to the first physical group. The physical group 92 belongs to the second physical group. The MMC 502 may access PUs 910(1) to 910(P) in the physical group 91 through a channel CH(1). In addition, the MMC 502 may access PUs 920(2) to 920(P) in the physical group 92 through a channel CH(2).

Figure 10:
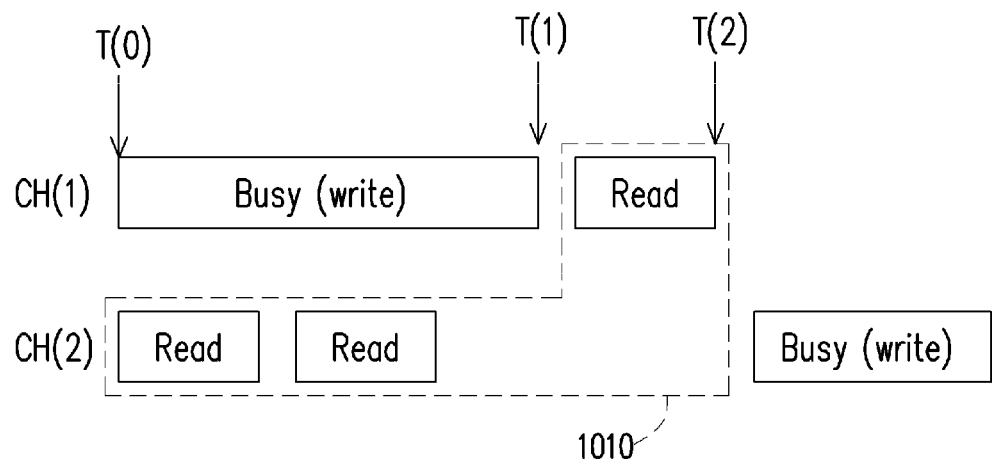
FIG. 10 is a schematic diagram illustrating states and timing of a plurality of channels in a data merge operation according to an exemplary embodiment of the disclosure.

FIG. 10 is a schematic diagram illustrating states and timing of a plurality of channels in a data merge operation according to an exemplary embodiment of the disclosure. Referring to FIGS. 9 and 10, in an exemplary embodiment, after the data merge operation is started, a portion of the valid data may be collected. Between time points T(0) and T(1), the MMC 502 may write the collected valid data to at least one PU (i.e., the recycle unit) in the physical group 91 through the channel CH(1). Therefore, between the time points T(0) and T(1), the channel CH(1) is in a busy state.

Meanwhile, in the data merge operation of FIG. 10, the MMC 502 may select a plurality of PUs in the physical groups 91 and 92 to serve as the source units of valid data 1010 and select at least one PU in the physical group 92 to serve as the recycle unit of the valid data 1010. Therefore, between the time points T(0) and T(1) (i.e., during the period when the channel CH(1) is in the busy state), the MMC 502 may collect a portion of the valid data 1010 from the source unit in the physical group 92 through the channel CH(2). However, another portion of the valid data 1010 can only be collected through the channel CH(1) after the channel CH(1) exits the busy state (e.g., after the time point T(1)). Therefore, the collection and writing of the valid data 1010 is delayed. For example, if the channel CH(1) exits the busy state at the time point T(1), the another portion of the valid data 1010 may be collected through the channel CH(1) between the time points T(1) and T(2). In other words, at the time point T(2), the valid data 1010 may be completely collected. Then, after the time point T(2), the channel CH(2) may enter the busy state, so as to write the entire valid data 1010 to the recycle unit in the physical group 92 through the channel CH(2).

It should be noted that, in the exemplary embodiment of FIG. 10, the MMC 502 does not perform the limited data collection operation. Therefore, there is a high chance that the PUs chosen to serve as the source units are dispersed in the physical groups 91 and 92. If the PUs serving as the source units are dispersed in the physical groups 91 and 92, a portion of the valid data needs to be collected from the physical group 91 through the channel CH(1) after the channel CH(1) exits the current busy state. During the period from the time when the channel CH(2) finishes the corresponding data reading to the time point T(2), the channel CH(2) is in an idle state, which results in a waste of system resources. In an exemplary embodiment, if it is limited that valid data collected from the physical group 91 (i.e., the first physical group) is not arranged during the period when the channel CH(1) is in the busy state, the collection of valid data may be completed earlier, and the collected valid data may be written to the physical group 92 through the channel CH(2), and the system resources are thus used more efficiently.

Figure 11:
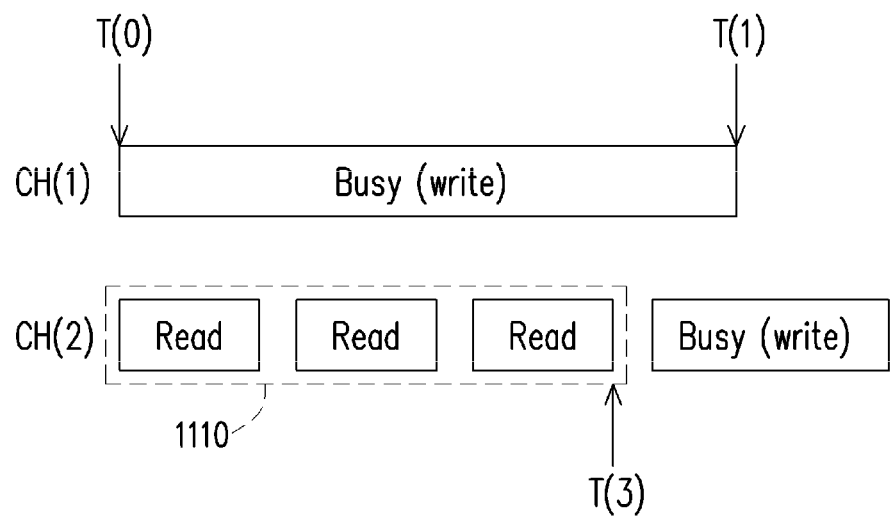
FIG. 11 is a schematic diagram illustrating states and timing of a plurality of channels in a data merge operation according to an exemplary embodiment of the disclosure.

FIG. 11 is a schematic diagram illustrating states and timing of a plurality of channels in a data merge operation according to an exemplary embodiment of the disclosure. Referring to FIGS. 9 and 11, in an exemplary embodiment, after the data merge operation is started, a portion of the valid data (i.e., the first data) may be collected. Between time points T(0) and T(1), the first write operation may be performed to write the collected valid data (i.e., the first data) to at least one PU (i.e., the recycle unit) in the physical group 91 (i.e., the first physical group). In correspondence with the first write operation, between the time points T(0) and T(1), the channel CH(1) is in the busy state.

Meanwhile, in the data merge operation of FIG. 11, the MMC 502 may perform the limited data collection operation. In the limited data collection operation, the MMC 502 (only) select at least one PU in the physical group 92 (i.e., the second physical group) to serve as the source unit of valid data 1110 (i.e., the second data) and/or does not select at least one PU in the physical group 91 (i.e., the first physical group) to serve as the source unit of the valid data 1110. Besides, the MMC 502 selects at least one PU in the physical group 92 to serve as the recycle unit of the valid data 1110.

Between the time points T(0) and T(1) (i.e., during the period when the channel CH(1) is in the busy state), the MMC 502 may collect the complete valid data 1110 from the source unit in the physical group 92 through the channel CH(2). Then, at a time point T(3) (the time point T(3) is located between the time points T(0) and T(1)), the MMC 502 may perform the second write operation, so as to write the valid data 1110 to the recycle unit in the physical group 92 through the channel CH(2).

In other words, between the time points T(3) and T(1), the channel CH(2) may enter the busy state earlier to write the valid data 1110 to the recycle unit in the physical group 92, so as to complete at least a portion of the data merge operation. Compared with the exemplary embodiment of FIG. 10, in the exemplary embodiment of FIG. 11, the valid data 1110 is collected prior to the time when the channel CH(1) exits the busy state. Therefore, the efficiency of the data merge operation is facilitated.

Back to FIG. 5, in an exemplary embodiment, in response to the start of the data merge operation, the MMC 502 may maintain table information in the buffer memory 510. The table information records information relating to the data merge operation. For example, the table information may include mapping information relating to a plurality of PUs selected to serve as the source unit and the recycle unit. According to the table information, the MMC 502 may maintain a command queue in the buffer memory 510. The command queue is configured to temporarily store at least one command (or command sequence). For example, the MMC 502 may generate at least one command (e.g., a read command) which instructs a collection of valid data from the source unit and at least one command (e.g., a write command) which instructs a writing of the collected valid data to the recycle unit according to the mapping information recorded in the table information. The MMC 502 may add the generated commands to the command queue. Then, the MMC 502 may sequentially perform the data write operation and the data collection operation in the data merge operation according to the commands in the command queue.

In an exemplary embodiment, the limited data collection operation may include an operation of choosing the PU to serve as the source unit and an operation of maintaining (or adjusting) the command queue. For example, in the limited data collection operation, the MMC 502 may increase the priority of a specific command (also referred to as a first command) in the command queue and/or decrease the priority of a specific command (also referred to as a second command) in the command queue. The first command is configured to instruct a collection of valid data (also referred to as first valid data) from the second physical group during the period of performing the first write operation. The second command is configured to instruct a collection of valid data (also referred to as second valid data) from the first physical group after the first write operation is completed.

Figure 12:
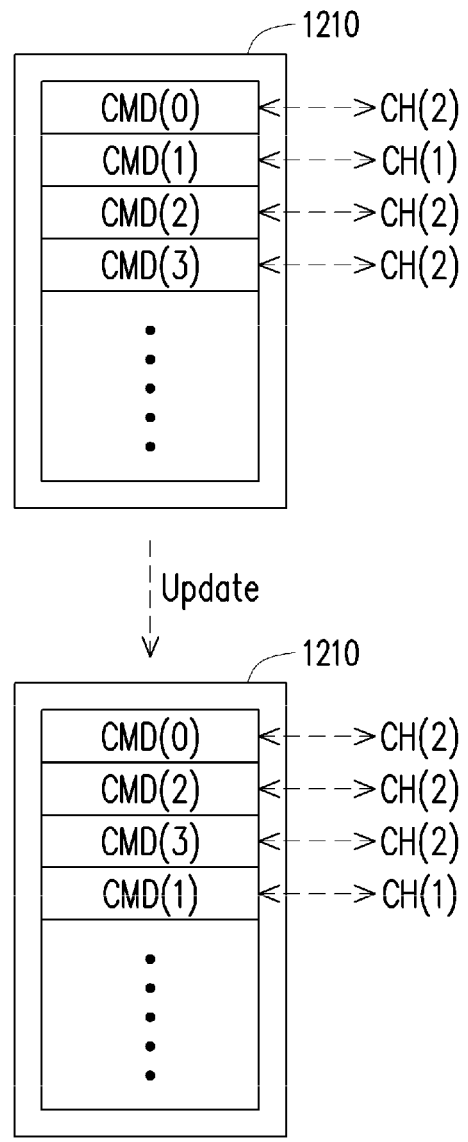
FIG. 12 is a schematic diagram illustrating updating a command queue according to an exemplary embodiment of the disclosure.

FIG. 12 is a schematic diagram illustrating updating a command queue according to an exemplary embodiment of the disclosure. Referring to FIGS. 9, 11, and 12, in an exemplary embodiment, after the data merge operation is started, commands CMD(0) to CMD(3) may be added to a command queue 1210. The commands CMD(0) to CMD(3) are all read commands for instructing to read data. The command queue 1210 may be stored in the buffer memory 510 of FIG. 5. The command CMD(1) instructs a reading of valid data from the physical group 91 through the channel CH(1). The commands CMD(0), CMD(2), and CMD(3) instruct readings of valid data from the physical group 92 through the channel CH(2). Besides, the ordered positions of the commands CMD(0) to CMD(3) in the command queue 1210 is indicative of the order in which the commands CMD(0) to CMD(3) are performed sequentially.

In the limited data collection operation, the ordered positions of the command CMD(0) to CMD(3) in the command queue 1210 may be updated. For example, the priorities of the command CMD(2) and CMD(3) may be moved up (or moved forward) and/or the priority of the command CMD (1) may be moved down (or moved backward). According to the updated command queue 1210, the commands CMD(0), CMD(2), and CMD(3) may be performed before the command CMD(1), so as to continuously read the valid data 1110 in FIG. 11 through the channel CH(2). After obtaining the complete valid data 1110, regardless of whether the channel CH(1) is in the busy state, the valid data 1110 may be immediately written to the physical group 92 through the channel CH(2). After the commands CMD(0), CMD(2), and CMD(3) are completed, the command CMD(1) may be performed, so as to read other valid data from the physical group 91 through the channel CH(1) after the channel CH(1) exits the busy state.

In the limited data collection operation according to an exemplary embodiment, the MMC 502 may evaluate a channel state of the first channel and sort at least one command (e.g., the commands CMD(0) to CMD(3) in FIG. 12) in the command queue according to the channel state of the first channel. For example, the MMC 502 may obtain the data amount of the valid data (i.e., the first data) to be written to the first physical group in the first write operation. According to the data amount, the MMC 502 may obtain a time duration (also referred to busy time of the first channel) in which the first channel is in the busy state in correspondence with the first write operation. Taking FIG. 11 as an example, the busy time of the first channel in correspondence with the first write operation is the time duration between the time points T(0) and T(1). The MMC 502 may sort a plurality of commands in the command queue (e.g., moving up the priorities of the commands CMD(2) and CMD(3) and/or moving down the priority of the command CMD(1) in the exemplary embodiment of FIG. 12) according to the busy time of the first channel.

It should be noted that, in the exemplary embodiment of FIG. 12, the MMC 502 may firstly add a plurality of commands to the command queue 1210 and then update the ordered positions of the commands in the command queue 1210. However, in another exemplary embodiment, the MMC 502 may also directly add the commands CMD(0) to CMD(3) based on the updated order as shown in FIG. 12 to the command queue 1210. The disclosure does not intend to impose a limitation on this regard.

Figure 13:
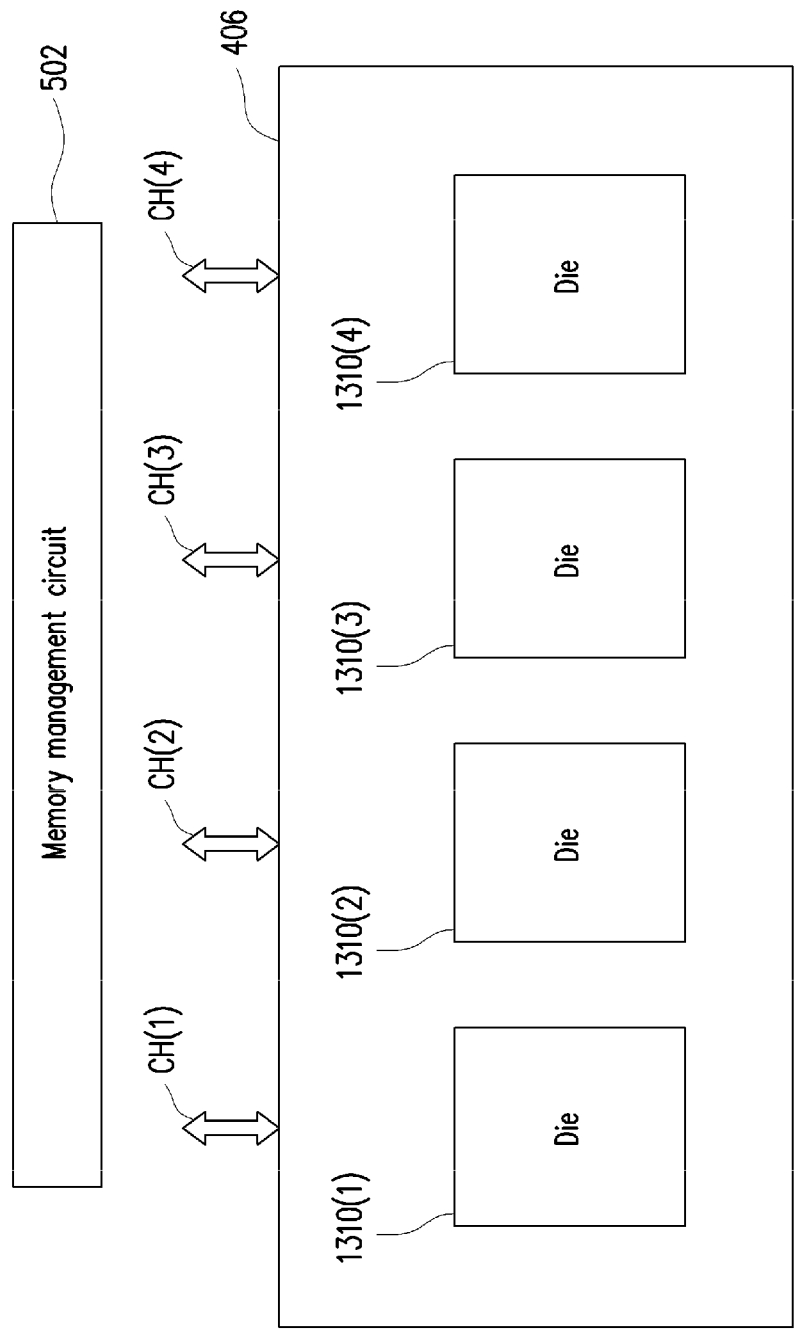
FIG. 13 is a schematic diagram illustrating a memory management circuit and a rewritable non-volatile memory module according to an exemplary embodiment of the disclosure.

FIG. 13 is a schematic diagram illustrating a MMC and a RNVM module according to an exemplary embodiment of the disclosure. Referring to FIG. 13, in the exemplary embodiment, the RNVM module 406 includes physical groups 1310(1) to 1310(4). The physical groups 1310(1) and 1310(2) belong to the first physical group. The physical groups 1310(3) and 1310(4) belong to the second physical group. For example, each physical group among the physical groups 1310(1) to 1310(4) may correspond to a die, a chip enable, or a memory plane. The channels CH(1) and CH(2) belong to the first channel, and channels CH(3) and CH(4) belong to the second channel. The MMC 502 may respectively access the PUs in the physical groups 1310(1) to 1310(4) through the channels CH(1) to CH(4).

Figure 14:
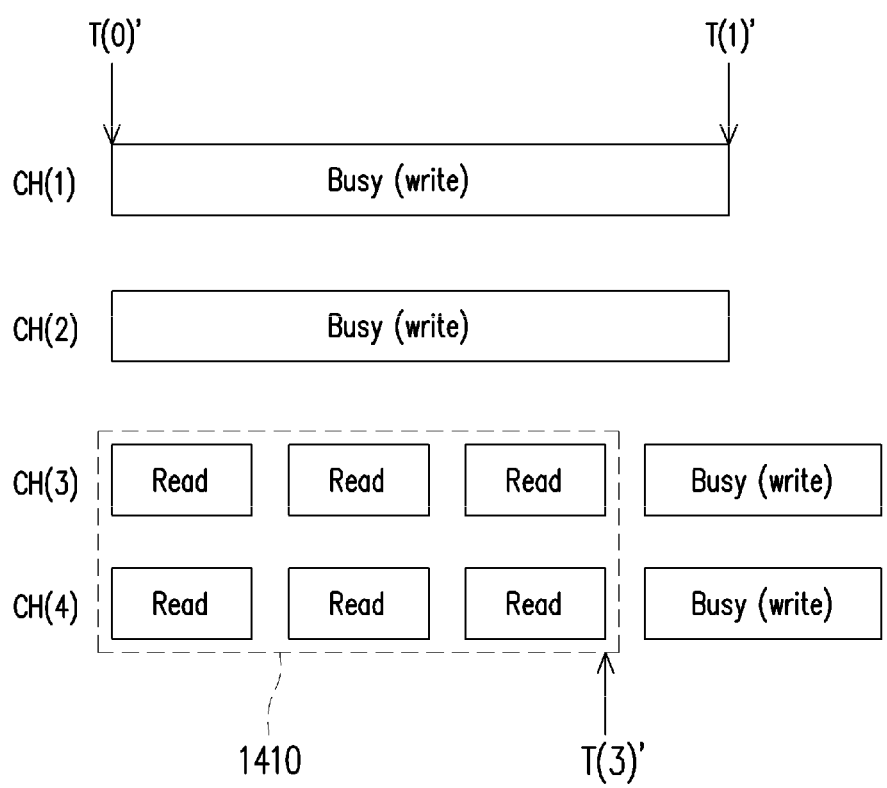
FIG. 14 is a schematic diagram illustrating states and timing of a plurality of channels in a data merge operation according to an exemplary embodiment of the disclosure.

FIG. 14 is a schematic diagram illustrating states and timing of a plurality of channels in a data merge operation according to an exemplary embodiment of the disclosure. Referring to FIGS. 13 and 14, after the data merge operation is started, a portion of the valid data (i.e., the first data) may be collected. Between time points T(0)' and T(1)', the MMC 502 may perform the first write operation, so as to write the first data to the PUs in the physical groups 1310(1) and 1310(2) in parallel through the channels CH(1) and CH(2). Therefore, between the time points T(0)' and T(1)', the channels CH(1) and CH(2) are in the busy state.

Meanwhile, the MMC 502 may perform the limited data collection operation to collect the second data. For example, the limited data collection operation may instruct a collection of valid data 1410 (i.e., the second data) from the source units in the physical groups 1310(3) and 1310(4) through the channels CH(3) and CH(4) between the time point T(0)' and T(1)' (i.e., the period when the channels CH(1) and CH(2) are busy). In addition, the limited data collection operation may forbid arranging a command for collecting data from the physical groups 1310(1) and 1310(2) after the time point T(1)' is past. Then, at a time point T(3)' (the time point T(3)' is located between the time points T(0)' and T(1)'), the MMC 502 may execute the second write operation, so as to write the collected valid data 1410 to the physical groups 1310(3) and 1310(4) in parallel through the channels CH(3) and CH(4).

In the limited data collection operation according to an exemplary embodiment, the MMC 502 may adjust the command queue (e.g., the command queue 1210 of FIG. 12), so as to arrange that each of at least one read command being a command not indicating a reading of data in the first physical group, wherein the at least one read command is arranged after at least one read command indicating the first write operation. For example, according to the busy time corresponding to the first write operation (i.e., the busy time of the first channel), the MMC 502 may limit that k read commands ordered after at least one write command instructing the first write operation should not be commands which instruct the reading of data from the first physical group. The value k may be a positive integer. The value k may be determined according to the busy time of the first channel. For example, the value k may be positively correlated with the busy time of the first channel.

In the limited data collection operation according to an exemplary embodiment, the MMC 502 may evaluate the state of the first channel (i.e., the channel state of the first channel) and move backward the ordered position of at least one read command for performing data reading through the first channel in the command queue according to the state of the first channel. Taking FIG. 14 as an example, the MMC 502 may move up the priority of the first command in the command queue and/or move down the priority of the second command in the command queue, so as to satisfy the operational timing of FIG. 14. For example, the MMC 502 may evaluate the time duration during which the channels CH(1) and CH(2) are in the busy state (i.e., the time duration between the time points T(0)' and T(1)') in correspondence with the first write operation. The MMC 502 may sort the commands in the command queue according to the time duration. Then, the MMC 502 may perform the data collection operation and the data write operation of FIG. 14 according to the ordered commands, so as to facilitate the efficiency of the data merge operation.

It should be noted that, in an exemplary embodiment, the first write operation, the second write operation, and the limited data collection operation are performed in response to the start of the data merge operation. However, in another exemplary embodiment, it is also possible that the first write operation is not performed in response to the start of the data merge operation. For example, in an exemplary embodiment, the first write operation may also be performed in response to a write command from the host system 11 of FIG. 1.

Figure 15:
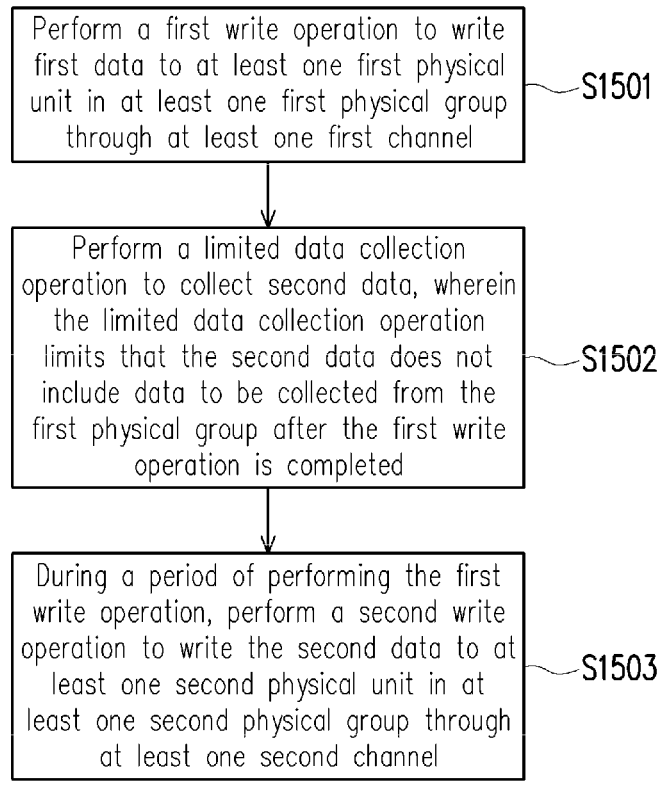
FIG. 15 is a flowchart illustrating a memory control method according to an exemplary embodiment of the disclosure.

FIG. 15 is a flowchart illustrating a memory control method according to an exemplary embodiment of the disclosure. Referring to FIG. 15, at Step S1501, a first write operation is performed to write first data to at least one first PU in at least one first physical group through at least one first channel. At Step S1502, a limited data collection operation is performed to collect second data. The limited data collection operation limits that the second data does not include data to be collected from the at least one first physical group after the first write operation is completed. At Step S1503, during a period of performing the first write operation, a second write operation is performed to write the second data to at least one second PU in at least one second physical group through at least one second channel. In addition, the limited data collection operation and the second write operation are configured to release at least one spare PU.

Figure 16:
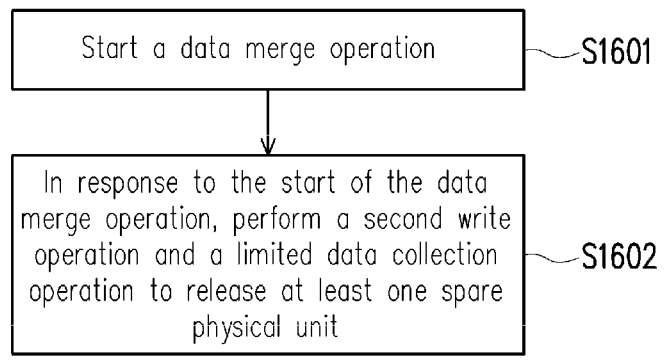
FIG. 16 is a flowchart illustrating a memory control method according to an exemplary embodiment of the disclosure.

FIG. 16 is a flowchart illustrating a memory control method according to an exemplary embodiment of the disclosure. Referring to FIG. 16, at Step S1601, a data merge operation is performed. At Step S1602, in response to the start of the data merge operation, the limited data collection operation and the second write operation are performed to release at least one spare PU.

Figure 17:
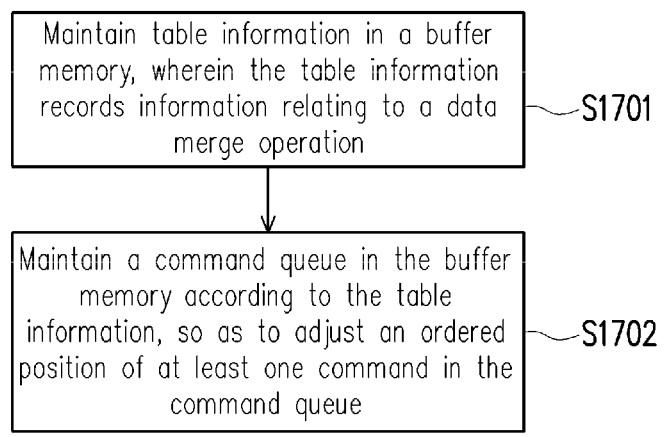
FIG. 17 is a flowchart illustrating a memory control method according to an exemplary embodiment of the disclosure.

FIG. 17 is a flowchart illustrating a memory control method according to an exemplary embodiment of the disclosure. Referring to FIG. 17, at Step S1701, table information is maintained in a buffer memory. In addition, the table information records information relating to the data merge operation. At Step S1702, a command queue is maintained in the buffer memory according to the table information, so as to adjust the ordered position of at least one command in the command queue. For example, the commands in the command queue may include read command and write command for the data merge operation.

However, the respective steps in FIGS. 15 to 17 are already described in detail in the foregoing, so the details thereof will not be repeated in the following. It should be noted that the respective steps in FIGS. 15 to 17 may be implemented as a plurality of programming codes or circuits. The disclosure does not intend to impose a limitation on this regard. Moreover, the methods of FIGS. 15 to 17 may be used together with the exemplary embodiments or used alone. The disclosure does not intend to impose a limitation on this regard.

In view of the foregoing, the RNVM module includes at least one first physical group and at least one second physical group. During the period of performing the first write operation to write the first data to the PU in the first physical group through the first channel, the second write operation may be performed to write the second data to the PU in the second physical group through the second channel. Besides, in the data merge operation, the limited data collection operation may also be performed to collect the second data. Specifically, the limited data collection operation is configured to limit that the second data does not include data to be collected from the first physical group after the first write operation is completed. Accordingly, the issue that the system performance is deteriorated because a specific channel is in the busy state and the valid data is unable to be collected in a real-time manner through the channel can be alleviated.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory control method for a rewritable non-volatile memory module, wherein the rewritable non-volatile memory module comprises at least one first physical group, at least one first channel connected electrically to the at least one first physical group, at least one second physical group and at least one second channel connected electrically to the at least one second physical group, and the memory control method comprises:
   performing a first write operation to write first data to at least one first physical unit in the at least one first physical group through the at least one first channel;
   performing a limited data collection operation to collect second data during the first write operation, wherein the limited data collection operation limits that the second data does not comprise data to be collected from the at least one first physical group after the first write operation is completed; and
   performing a second write operation during a period of performing the first write operation, so as to write the second data to at least one second physical unit in the at least one second physical group through the at least one second channel,
   wherein the limited data collection operation and the second write operation are configured to release at least one spare physical unit, and the first write operation and the second write operation are performed at least in partial parallel,
   wherein the limited data collection operation includes adjusting a command queue in a buffer memory, so as to arrange each of at least one read command being a command not indicating a reading of data in the first physical group, and the at least one read command is arranged after at least one read command indicating the first write operation.

2. The memory control method as claimed in claim 1, further comprising:
   starting a data merge operation to perform the limited data collection operation and the second write operation.

3. The memory control method as claimed in claim 1, wherein the at least one first channel is in a busy state during the period of performing the first write operation.

4. The memory control method as claimed in claim 1, wherein the at least one first physical group corresponds to at least one first die in the rewritable non-volatile memory module, and the at least one second physical group corresponds to at least one second die in the rewritable non-volatile memory module.

5. The memory control method as claimed in claim 1, wherein the limited data collection operation comprises:
   adjusting a priority of at least one command in a buffer memory, wherein the at least one command is configured to instruct a collecting of valid data from the at least one first physical group after the first write operation is completed.

6. The memory control method as claimed in claim 1, wherein the limited data collection operation comprises:
   maintaining table information in a buffer memory, wherein the table information records information relating to a data merge operation; and
   adjusting an ordered position of at least one command in the buffer memory according to the table information.

7. The memory control method as claimed in claim 6, wherein adjusting the ordered position of the at least one command in the buffer memory according to the table information comprises:
   sorting the at least one command according to a channel state of the at least one first channel.

8. The memory control method as claimed in claim 7, wherein sorting the at least one command according to the channel state of the at least one first channel comprises:
   evaluating a busy time of the at least one first channel in correspondence with the first write operation; and
   sorting the at least one command according to the busy time.

9. The memory control method as claimed in claim 1, wherein the limited data collection operation comprises:
   evaluating a state of the at least one first channel; and
   moving backward an ordered position of at least one read command for performing data reading through the at least one first channel in a command queue according to the state of the at least one first channel.

10. A memory storage device, comprising:
   a connection interface unit, configured to be coupled to a host system;
   a rewritable non-volatile memory module, comprising at least one first physical group, at least one first channel connected electrically to the at least one first physical group, at least one second physical group and at least one second channel connected electrically to the at least one second physical group; and
   a memory control circuit unit, coupled to the connection interface unit and the rewritable non-volatile memory module,
   wherein the memory control circuit unit is configured to perform a first write operation to write first data to at least one first physical unit in the at least one first physical group through the at least one first channel,
   the memory control circuit unit is further configured to perform a limited data collection operation to collect second data during the first write operation, wherein the limited data collection operation limits that the second data does not comprise data to be collected from the at least one first physical group after the first write operation is completed,
   the memory control circuit unit is further configured to perform a second write operation during a period of performing the first write operation, so as to write the second data to at least one second physical unit in the at least one second physical group through the at least one second channel, and
   the limited data collection operation and the second write operation are configured to release at least one spare physical unit, and the first write operation and the second write operation are performed at least in partial parallel,
   wherein the limited data collection operation includes adjusting a command queue in a buffer memory, so as to arrange each of at least one read command being a command not indicating a reading of data in the first physical group, and the at least one read command is arranged after at least one read command indicating the first write operation.

11. The memory storage device as claimed in claim 10, wherein the memory control circuit unit is further configured to start a data merge operation to perform the limited data collection operation and the second write operation.

12. The memory storage device as claimed in claim 10, wherein the at least one first channel is in a busy state during the period of performing the first write operation.

13. The memory storage device as claimed in claim 10, wherein the at least one first physical group corresponds to at least one first die in the rewritable non-volatile memory module, and the at least one second physical group corresponds to at least one second die in the rewritable non-volatile memory module.

14. The memory storage device as claimed in claim 10, wherein the limited data collection operation comprises:
adjusting a priority of at least one command in a buffer memory, wherein the at least one command is configured to instruct a collecting of valid data from the at least one first physical group after the first write operation is completed.

15. The memory storage device as claimed in claim 10, wherein the limited data collection operation comprises:
maintaining table information in a buffer memory of the memory control circuit unit, wherein the table information comprises information relating to a data merge operation; and
adjusting an ordered position of at least one command in the buffer memory according to the table information.

16. The memory storage device as claimed in claim 15, wherein an operation for adjusting the ordered position of the at least one command in the buffer memory by the memory control circuit unit according to the table information comprises:
sorting the at least one command according to a channel state of the at least one first channel.

17. The memory storage device as claimed in claim 16, wherein an operation for sorting the at least one command by the memory control circuit unit according to the channel state of the at least one first channel comprises:
evaluating a busy time of the at least one first channel in correspondence with the first write operation; and
sorting the at least one command according to the busy time.

18. The memory storage device as claimed in claim 10, wherein the limited data collection operation comprises:
evaluating a state of the at least one first channel; and
moving backward an ordered position of at least one read command for performing data reading through the at least one first channel in a command queue according to the state of the at least one first channel.

19. A memory control circuit unit for controlling a rewritable non-volatile memory module, wherein the rewritable non-volatile memory module comprises at least one first physical group, at least one first channel connected electrically to the at least one first physical group, at least one second physical group and at least one second channel connected electrically to the at least one second physical group, and the memory control circuit unit comprises:
a host interface, configured to be coupled to a host system;
a memory interface, configured to be coupled to the rewritable non-volatile memory module;
a buffer memory; and
a memory management circuit, coupled to the host interface, the memory interface, and the buffer memory,
wherein the memory management circuit is configured to perform a first write operation to write first data to at least one first physical unit in the at least one first physical group through the at least one first channel,
the memory management circuit is further configured to perform a limited data collection operation to collect second data during the first write operation, wherein the limited data collection operation limits that the second data does not comprise data to be collected from the at least one first physical group after the first write operation is completed,
the memory management circuit is further configured to perform a second write operation during a period of performing the first write operation, so as to write the second data to at least one second physical unit in the at least one second physical group through the at least one second channel, and
the limited data collection operation and the second write operation are configured to release at least one spare physical unit, and the first write operation and the second write operation are performed at least in partial parallel,
wherein the limited data collection operation includes adjusting a command queue in the buffer memory, so as to arrange each of at least one read command being a command not indicating a reading of data in the first physical group, and the at least one read command is arranged after at least one read command indicating the first write operation.

20. The memory control circuit unit as claimed in claim 19, wherein the memory management circuit is further configured to start a data merge operation to perform the limited data collection operation and the second write operation.

21. The memory control circuit unit as claimed in claim 19, wherein the at least one first channel is in a busy state during the period of performing the first write operation.

22. The memory control circuit unit as claimed in claim 19, wherein the at least one first physical group corresponds to at least one first die in the rewritable non-volatile memory module, and the at least one second physical group corresponds to at least one second die in the rewritable non-volatile memory module.

23. The memory control circuit unit as claimed in claim 19, wherein the limited data collection operation comprises:
adjusting a priority of at least one command in the buffer memory, wherein the at least one command is configured to instruct a collecting of valid data from the at least one first physical group after the first write operation is completed.

24. The memory control circuit unit as claimed in claim 19, wherein the limited data collection operation comprises:
maintaining table information in the buffer memory, wherein the table information comprises information relating to a data merge operation; and
adjusting an ordered position of at least one command in the buffer memory according to the table information.

25. The memory control circuit unit as claimed in claim 24, wherein an operation for adjusting the ordered position of the at least one command in the buffer memory by the memory management circuit according to the table information comprises:
sorting the at least one command according to a channel state of the at least one first channel.

26. The memory control circuit unit as claimed in claim 25, wherein an operation for sorting the at least one command by the memory management circuit according to the channel state of the at least one first channel comprises:
evaluating a busy time of the at least one first channel in correspondence with the first write operation; and
sorting the at least one command according to the busy time.

27. The memory control circuit unit as claimed in claim 19, wherein the limited data collection operation comprises:

evaluating a state of the at least one first channel; and
moving backward an ordered position of at least one read command for performing data reading through the at least one first channel in a command queue according to the state of the at least one first channel.

* * * * *